(12) United States Patent
Braunheim et al.

(10) Patent No.: US 6,754,044 B1
(45) Date of Patent: Jun. 22, 2004

(54) SWAGE MOUNTING USING SURFACE PROTRUSIONS

(75) Inventors: Stephen Thomas Braunheim, Santa Barbara, CA (US); Ernest Edward Swayney, Newberry Park, CA (US)

(73) Assignees: David A. Janes, Newport Beach, CA (US); Stephen T. Braunheim, Santa Barbara, CA (US)

( * ) Notice: Subject to any disclaimer, the term of this patent is extended or adjusted under 35 U.S.C. 154(b) by 221 days.

(21) Appl. No.: 10/037,643

(22) Filed: Dec. 21, 2001

Related U.S. Application Data

(60) Continuation-in-part of application No. 09/440,840, filed on Nov. 16, 1999, now Pat. No. 6,351,349, which is a division of application No. 09/081,710, filed on May 19, 1998, now Pat. No. 6,231,698.

(51) Int. Cl.⁷ .............................. G11B 5/48; G11B 21/16
(52) U.S. Cl. ................. 360/244.6; 360/244.5; 360/266.1
(58) Field of Search ............................ 360/266.1, 244.5, 360/244.6

(56) References Cited

U.S. PATENT DOCUMENTS

| | | | | |
|---|---|---|---|---|
| 4,481,702 A | * | 11/1984 | Mitchell | 29/432 |
| 5,717,545 A | * | 2/1998 | Brooks et al. | 360/244.6 |
| 5,896,646 A | * | 4/1999 | Boutaghou et al. | 29/603.01 |
| 6,128,164 A | * | 10/2000 | Kant et al. | 360/244.5 |
| 6,231,698 B1 | * | 5/2001 | Braunheim et al. | 148/606 |
| 6,351,349 B1 | * | 2/2002 | Braunheim et al. | 360/244.6 |
| 6,353,994 B1 | * | 3/2002 | Boutaghou et al. | 29/603.03 |
| 6,368,685 B1 | * | 4/2002 | Schmidt et al. | 428/34.1 |
| 6,372,314 B1 | * | 4/2002 | Schmidt et al. | 428/34.1 |
| 2003/0156357 A1 | * | 8/2003 | Brink et al. | 360/244.6 |

FOREIGN PATENT DOCUMENTS

JP 11123791 A * 5/1999 ........... B32B/27/00

OTHER PUBLICATIONS

"Domelock Low Profile Suspension to Arm Attachment Method," May 1, 1995, IBM Technical Disclosure Bulletin, vol. No. 38, Iss. No. 5, pp. 335–338.*

\* cited by examiner

*Primary Examiner*—William Klimowicz
(74) *Attorney, Agent, or Firm*—Mitchell Silberberg & Knupp LLP

(57) ABSTRACT

Provided is a component for use in swage mounting that includes a base plate, having a first side and a second side, and a hub which preferably is cylindrically shaped. The hub is primarily comprised of a first material (such as stainless steel), extends from the second side of the base plate, and has an inner surface and an outer surface. The outer surface of the hub includes numerous protrusions that are less than approximately 50 microns in height and that are primarily comprised of a second material (such as a carbide or a nitride) which is different from the first material. Preferably, the protrusions are substantially harder (such as at least 50 hardness Vickers harder) than the base material.

49 Claims, 2 Drawing Sheets

SWAGE MOUNTING USING SURFACE PROTRUSIONS

This is a continuation-in-part of co-pending U.S. patent application Ser. No. 09/440,840 filed on Nov. 16, 1999 now U.S. Pat. No. 6,351,349, which, in turn, is a divisional application of U.S. patent application Ser. No. 09/081,710 filed on May 19, 1998, and issued as U.S. Pat. No. 6,231,698 on May 15, 2001. The foregoing applications are incorporated herein by reference as though set forth herein in full.

BACKGROUND OF THE INVENTION

1. Field of the Invention

The present invention generally concerns swage mounting and swage mounted assemblies, such as swage mounts used to connect components used in an actuator arm assembly for a computer hard disk drive.

2. Description of the Prior Art

Swage mounting is used in a wide variety of fastening applications, particularly where assembly cost and height profile are important considerations. One important use of swage mounting is in the construction of disk drives.

Disk drives are used in a variety of devices such as computers, facsimile machines, copiers and any other equipment where mass digital data storage is desired. Two important and costly sub-assemblies in disk drives are a head gimbal assembly (HGA) and a controller driven actuator assembly, referred to as a head stack assembly (HSA). An HSA comprises one or more HGAs, an actuator body, a coil and a bearing. Included in the HGA is a read/write head that is capable of reading digital information stored on platters in the disk drive. The HSA precisely positions the read/write head vertically adjacent a precise point on the disk drive platter, with the actuator directing the movement of the HGA across the face of the platter. Each HGA includes precision-made components manufactured to exacting standards. Because of the complexity involved in each HGA, manufacturers have found that having the ability to disconnect and reconnect the HGA from the HSA substantially reduces costs should either assembly require rework or replacement.

To facilitate the cost-effective repair and/or replacement of these assemblies, the HGA and HSA are typically connected at a stacked joint defined by the distal end of the pivoting actuator arm and the proximal end of a thin elongated load beam. The opposite end of the load beam supports the read/write head that sweeps across the disk platter in response to an actuator controller. Satisfactory operation of the drive requires the read/write head to be selectively positioned vertically adjacent to selected annular data tracks formed on the platter within response times on the order of milliseconds. Such response involves high levels of acceleration. In the event of the actuator accidentally contacting the crash stop during seek, the acceleration levels can reach levels of several hundred Gs. To determine the torque exerted upon the swage mount connection during a crash stop or seek event, the worst case assumptions are made. A conservative estimate for an HGA mass is 100 mg (only the portion extending from the swage mount), with a centroid located 5.6 mm from the swage mount boss centerline. A nano slider (6 mg) typically is located 18 mm from the boss centerline. Using these assumptions, the torque exerted upon the swage mount is at most 0.0007 N*mm/m/s$^2$ [0.00171 in-oz/G]. Thus, if a 1000G shock event occurred, the resulting torque exerted on the swage mount would be 1.7 in-oz.

During the hard disk drive assembly process, there are several steps which involve placing the HSA in various fixtures and machines. A lateral force of 100 grams (0.22 lbs) on a load beam at a distance of 15 mm (0.59 inch) from the boss centerline results in a torque of 14.7 N-mm (3.8 in-oz). Therefore, the fastener connecting the actuator arm to the load beam must have the capability to withstand considerable torque, on the order of 4–5 inch-ounces or more.

Disk drive manufacturers continually endeavor to reduce the size of their disk drives to meet market demands for faster drive operating speed and increased storage capacity. To increase storage capacity, additional double-sided platters are vertically stacked with each platter having its own HGA. However, adding platters to a disk drive has the undesirable effects of increasing the vertical profile of the drive, increasing component cost and impairing component reliability. As a result, manufacturers have endeavored to miniaturize existing drive components.

One such method for reducing the overall drive size is to reduce the size of the stacked vertical joint connecting the HGAs to the HSA. For example, in U.S. Pat. No. 5,689,389 (Braunheim '389), the contents of which are incorporated herein by reference as though set forth herein in full, a low profile swage mount fastener is used to connect the load beam of the HGA to the actuator arm of the HSA. Because the swage mount fastener has a low profile, the overall height of the disk drive may be reduced, especially in drives using multiple platters and HGAs. However, a disadvantage of using a low profile swage mount fastener is that as performance demands increase, it provides less torque retention than is required to withstand the force levels imposed on the load beam during drive assembly and during shock events.

In Braunheim '389, the torque retention characteristics of a low profile swage mount fastener were increased by modifying the internal geometry of the swage mount. However, the level of torque retention that can be achieved solely by modifying the swage mount design is limited. Without increased torque retention values, the shock-driven acceleration rate a load beam can withstand is limited, which imposes an upper limit on the robustness of the drive package and handling constraints on the drive assembly processes. Accordingly, there is a shortcoming in the art in the unavailability of a low profile swage mount fastener capable of torque retention values that are significantly higher than have been previously achieved.

Moreover, as a platter is accelerated the read/write heads begin to fly, forming an air bearing between the head and the platter. For optimal performance, fly height above the platter must be controlled very tightly, e.g., to between 0.5 and 2 microinch ($\mu$ inch). If the head moves too far away from the platter, drive read/write operations are adversely affected. To accomplish the required control, the load beam portion of the HGA is "pre-loaded," that is, it is biased toward the platter. In pre-loading, the load beam is curved downwardly, such that the read/write head is biased toward the platter. Pre-loading thus creates a downward force on the head so that during drive operation this downward force balances the air bearing and therefore restrains the head from moving away from the optimal height above the platter. Generally, pre-loading of 20 to 40 mN (2 to 4 grams) of force is sufficient to achieve this result. The goal of pre-loading is to achieve an appropriate balance such that the head is close enough to the disk to be able to accurately read data but not so close that the head physically contacts the disk A present drawback in using a swage mount fastener to join the HGA to the HSA is that the process of swaging causes "gram change," i.e., it changes the delicate balance achieved through pre-loading. The effect swaging has on gram change is measured by comparing the pre-swage gram load of the HGA when loaded to operating height versus the post-swage gram load. It has been found that an average gram change of about 20 to 100 milligrams (mg) occurs as a result of the swaging process. Accordingly, it would be desirable to provide a low profile swage mount fastener in which gram change could be reduced while increasing torque retention values.

SUMMARY OF THE INVENTION

The present invention addresses these problems by providing components that are specially adapted for better swage mounting and by providing various techniques that can be used in the manufacture of such components.

Swage Mounting Using Increased Surface Hardness

The present invention addresses the problems in the prior art by providing a swage mounting component that has a hardened surface. In this manner, improved torque retention characteristics often can be achieved. More specifically, this aspect of the invention generally concerns swage mounting and swage mounted assemblies, such as swage mounts used to connect components used in an actuator arm assembly for a computer hard disk drive.

Thus, the invention is directed to a component for use in swage mounting that includes a base plate, having a first side and a second side, and a hub which preferably is cylindrically shaped. The hub extends from the second side of the base plate, and has an inner surface, an outer surface and a core portion disposed between the inner surface and the outer surface. It is a feature of this aspect of the invention that the outer surface of the hub is at least 20 hardness Vickers harder than the core of the hub. Preferably, the component is a swage mount for connecting a disk drive actuator arm to a disk drive load beam.

In preferred embodiments of the above: the hub is comprised primarily of stainless steel, such as 300 series stainless steel or austenitic stainless steel; the outer surface of the hub has been hardened by a mechanical method, a bead blasting method, a heat process, a carburizing method or a nitriding method; the hub is primarily comprised of a base material, and the outer surface of the hub is plated with a second material which is different than the base material; the hub is cylindrically shaped and has a central axis that is perpendicular to the second side of the base portion; the component is a swage mount for connecting a disk drive actuator arm to a disk drive load beam; the first side of the base plate includes an opening, and the inner surface of the hub substantially coincides with the opening in the first side of the base plate; and/or the outer surface of the hub is at least 30 hardness Vickers harder than the core of the hub.

The invention also is directed to a swage mounted assembly that includes a first component and a second component. The first component includes a base plate, having a first side and a second side, and a hub that extends from the second side of the base plate and has an inner surface and an outer surface. The second component includes an opening having an inner surface that is slightly larger than the outer surface of the hub, such that the hub can be received within the opening in the second component. At least one of the following conditions is satisfied: (1) the outer surface of the hub is at least 20 hardness Vickers harder than the core of the hub and (2) the inner surface of the opening in the second component is at least 20 hardness Vickers harder than the core of the second component.

In preferred embodiments of the above: the hub is comprised primarily of stainless steel, such as austenitic stainless steel; the at least 20 hardness Vickers hardness differential has been achieved by performing a carburizing process, a nitriding process, a laser surface hardening process, or a process of plating with a material which is different than an underlying base material; the hub is cylindrically shaped and has a central axis that is perpendicular to the second side of the base portion; one of the first component and the second component comprises one of a disk drive actuator arm and a disk drive load beam; and/or at least one of the following conditions is satisfied: (1) the outer surface of the hub is at least 30 hardness Vickers harder than the core of the hub and (2) the inner surface of the opening in the second component is at least 30 hardness Vickers harder than the core of the second component.

By virtue of the foregoing arrangements, the torque retention characteristics of the swage mount typically can be increased during swage mounting. As a result, the internal geometry of the swage mount typically can be modified to improve gram change characteristics and/or to reduce the mass of the swage mount.

Swage Mounting Using Surface Protrusions

The present invention also addresses the foregoing problems by providing a swage mounting component that includes surface protrusions. In this manner, improved torque retention characteristics often can be achieved.

Thus, in one aspect, the invention is directed to a component for use in swage mounting that includes a base plate, having a first side and a second side, and a hub which preferably is cylindrically shaped. The hub is primarily comprised of a first material (such as stainless steel), extends from the second side of the base plate, and has an inner surface and an outer surface. The outer surface of the hub includes numerous protrusions that are less than approximately 50 microns in height and that are primarily comprised of a second material (such as a carbide or a nitride) which is different from the first material.

In a further aspect, the invention is directed to a component for use in swage mounting that includes a base plate, having a first side and a second side, a hub which preferably is cylindrically shaped. The hub is primarily comprised of a base material (such as stainless steel), extends from the second side of the base plate, and has an inner surface and an outer surface. The outer surface of the hub includes numerous protrusions that are less than approximately 50 microns in height and that are substantially harder (such as at least 50 hardness Vickers harder) than the base material. Such protrusions might, for example, be comprised primarily of a nitride or a carbide.

In a still further aspect, the invention is directed to a component for use in swage mounting that includes a base plate, having a first side and a second side, and a hub which preferably is cylindrically shaped. The hub extends from the second side of the base plate and has an inner surface and an outer surface. The outer surface of the hub includes numerous protrusions that are from 0.5 to 50 microns in height. The component might, for example, be a swage mount for connecting a disk drive actuator arm to a disk drive load beam.

In a still further aspect, the invention is directed to a swage mounting assembly that includes a first component and a second component. The first component includes a base plate, having a first side and a second side, and a hub extending from the second side of the base plate and having an inner surface and an outer surface. The second component includes an opening having an inner surface that is slightly larger than the outer surface of the hub, such that the hub can be received within the opening in the second component. According to this aspect of the invention, at least one of the following conditions is satisfied: (1) the hub is comprised primarily of a first material and the outer surface of the hub includes numerous protrusions that are less than approximately 50 microns in height and that are comprised of a second material which is different from the first material; or (2) the second component is comprised primarily of the first material and the inner surface of the opening in the second component includes numerous protrusions that are less than approximately 50 microns in height and that are comprised of the second material.

In a still further aspect, the invention is directed to a swage mounted assembly that includes a first component and a second component. The first component includes a base plate, having a first side and a second side, and a hub extending from the second side of the base plate and having an inner surface and an outer surface. The second component includes an opening having an inner surface that is slightly larger than the outer surface of the hub, such that the hub can be received within the opening in the second component. According to this aspect of the invention, at least one of the following conditions is satisfied: (1) the hub is comprised primarily of a base material and the outer surface of the hub includes numerous protrusions that are less than approximately 50 microns in height and that are substantially harder than the base material; or (2) the second component is comprised primarily of the base material and the inner surface of the opening in the second component includes numerous protrusions that are less than approximately 50 microns in height and that are substantially harder than the base material.

In a still further aspect, the invention is directed to a swage mounted assembly that includes a first component and a second component. The first component includes a base plate, having a first side and a second side, and a hub extending from the second side of the base plate and having an inner surface and an outer surface. The second component includes an opening having an inner surface that is slightly larger than the outer surface of the hub, such that the hub can be received within the opening in the second component. According to this aspect of the invention, at least one of the outer surface of the hub and the inner surface of the opening in the second component includes numerous protrusions that are from 0.5 to 50 microns in height.

By utilizing surface protrusions in any of the foregoing arrangements, the torque retention characteristics of the swage mount typically can be increased without negatively affecting other properties of the swage mount, such as impairing plastic deformation. As a result, the internal geometry of the swage mount typically can be modified to improve gram change characteristics and/or to reduce the mass of the swage mount.

Carburizing Techniques

The present invention also addresses the foregoing problems in the prior art by providing carburizing techniques that can be used to more efficiently produce components for use in swage mounting, as well as various other types of components. More specifically, this aspect of the present invention generally concerns carburizing techniques, such as carburizing techniques for surface hardening a metal component.

Thus, the invention is directed to carburizing metal. Initially, a furnace is filled with a carburizing gas mixture consisting of a carbon-rich gas and a carrier gas that is lighter than air, and the furnace is heated to a carburizing temperature of at least 1600° Fahrenheit. Next, a piece of metal is placed into the furnace while the furnace is heated to the carburizing and filled with the carburizing gas mixture. Thereafter, the piece of metal is removed from the furnace. Preferably, the carrier gas is non-endothermic and/or a reducing gas. More preferably, the carrier gas consists primarily of hydrogen.

In preferred embodiments of the above: the carrier gas is non-endothermic; the carrier gas primarily comprises a reducing gas; the carbon-rich gas is comprised primarily of methane; the carrier gas is comprised primarily of hydrogen; the non-endothermic carrier gas is essentially all hydrogen gas; the piece of metal moves through the furnace on a continuous belt; the furnace is a humpback furnace; the piece of metal remains in the furnace for 5 to 15 minutes; the carburizing temperature of the furnace is not greater than 2000° Fahrenheit; the piece of metal has a transformation temperature above which annealing occurs and below which stress relief occurs, and the carburizing temperature of the furnace is not less than the transformation temperature of the piece of metal; the carburizing gas mixture is controlled such that the carbon-rich gas accounts for 2 to 4% of the mixture by mass; the piece of metal is a swage mount; and/or the swage mount is for use in a hard disk drive HSA.

The invention also is directed to carburizing a piece of metal that has a transformation temperature above which annealing occurs and below which stress relief occurs. Initially, a furnace is filled with a carburizing gas mixture consisting of a carbon-rich gas and a carrier gas comprised primarily of hydrogen gas, and the furnace is heated to a carburizing temperature that is between the transformation temperature of the piece of metal and approximately 2000° Fahrenheit. Next, the piece of metal is placed into the furnace while heated to the carburizing temperature and filled with the carburizing gas mixture. Finally, the piece of metal is removed from the furnace after approximately 5 to 15 minutes.

In preferred embodiments of the above: the carburizing gas mixture is controlled such that the carbon-rich gas accounts for approximately 2 to 4% of the mixture by mass; the carbon-rich gas primarily comprises methane; the piece of metal moves through the furnace on a continuous belt; the furnace is a humpback furnace; the piece of metal is comprised primarily of stainless steel; the stainless steel is 300 series stainless steel; the piece of metal is a swage mount component; the piece of metal is a component for use a hard drive HSA; and/or the carrier gas is essentially all hydrogen gas.

The invention also is directed to carburizing a piece of metal that has a transformation temperature above which annealing occurs and below which stress relief occurs. Initially, a furnace is filled with a carburizing gas mixture consisting of a carbon-rich gas and a carrier gas that is comprised primarily of hydrogen gas, and the furnace is heated to a carburizing temperature that is between the transformation temperature of the piece of metal and approximately 2000° Fahrenheit. Then, the piece of metal is placed into the furnace while heated to the carburizing temperature and filled with the carburizing gas mixture. After approximately 5 to 15 minutes, the piece of metal is removed from the furnace. According to this aspect of the invention, the carburizing gas mixture is controlled such that the carbon-rich gas accounts for approximately 2 to 4% of the mixture by mass, and the piece of metal moves through the furnace on a continuous belt.

In preferred embodiments of the above: the carbon-rich gas is comprised primarily of methane; the furnace is a humpback furnace; the piece of metal is comprised primarily of stainless steel; the stainless steel is 300 series stainless steel; the piece of metal is a swage mount; and/or the swage mount is for use in a hard disk drive HSA.

By utilizing a carrier gas that is lighter than air, the above carburizing process often can be conducted in a continuous belt furnace, such as a humpback furnace. Thus, carburization according to the present invention often can be accomplished more efficiently than conventional techniques, while simultaneously reducing the amount of ambient air that leaks into the furnace. By utilizing a reducing gas, such as hydrogen, the buildup of oxides on the surface of the component also can be inhibited.

Nitriding Techniques

The present invention also addresses the foregoing problems in the prior art by providing nitriding techniques that can be used to more efficiently produce components for use in swage mounting, as well as various other types of components. More specifically, this aspect of the present invention generally concerns nitriding techniques, such as nitriding techniques for surface hardening a metal component.

Thus, the invention is directed to nitriding metal having a transformation temperature above which annealing occurs and below which stress relief occurs. A piece of metal is placed into a furnace which has been heated to a temperature of between 900° Fahrenheit and the transformation temperature of the metal and which has been filled with a mixture of nitrogen-bearing gas (i.e., either $N_2$ or a nitrogen compound gas) and a carrier gas that includes hydrogen gas. The piece of metal is then removed from the furnace after a predetermined period of time.

In preferred embodiments of the above: the furnace is a continuous furnace; the predetermined period of time is from 5 to 15 minutes; the temperature of the furnace is between 1400° and 1600° Fahrenheit; the mixture of nitrogen-bearing gas and the carrier gas is controlled such that the nitrogen accounts for approximately 4 to 8% of the mixture by mass; the furnace does not contain a catalyst; the metal is stainless steel; the piece of metal is a swage mount component; the piece of metal is a component for use in a hard drive HSA; the carrier gas is comprised primarily of hydrogen gas; and/or the carrier gas is comprised essentially entirely of hydrogen gas.

The invention also is directed to nitriding metal having a transformation temperature above which annealing occurs and below which stress relief occurs. A piece of metal is placed into a furnace which has been heated to a temperature of between 900° Fahrenheit and the transformation temperature of the metal and which has been filled with a mixture of nitrogen gas and a carrier gas that includes hydrogen gas. The piece of metal is removed from the furnace after a predetermined period of time. According to this aspect of the invention, the mixture of nitrogen gas and hydrogen gas is controlled such that the nitrogen accounts for approximately 4 to 8% of the mixture by mass, in one embodiment, or approximately 20% in another embodiment.

In preferred embodiments of the above: the furnace is a continuous furnace; the predetermined period of time is from 5 to 15 minutes; the temperature of the furnace is between 1400 and 1600° Fahrenheit in one embodiment or approximately 2000° Fahrenheit in another; the furnace does not contain a catalyst; the metal is stainless steel; the metal is series 300 stainless steel; the metal is austenitic stainless steel; the piece of metal is a swage mount component; the piece of metal is a component for use in a hard drive HSA; the carrier gas is comprised primarily of hydrogen gas; and/or the carrier gas is comprised essentially entirely of hydrogen gas.

The invention also is directed to nitriding a piece of metal by placing it into a furnace which has been heated to a temperature of between approximately 1400 and 1600° Fahrenheit and which has been filled with a mixture of HSA and a carrier gas that includes hydrogen gas, with the mixture being controlled such that the nitrogen accounts for approximately 4 to 8% of the mixture by mass. The piece of metal is removed from the furnace after approximately 5 to 15 minutes.

In preferred embodiments of the above: the furnace does not contain a catalyst; the metal is stainless steel; the metal is series 300 stainless steel; the metal is austenitic stainless steel; the piece of metal is a swage mount component; the piece of metal is a component for use in a hard drive HSA; the carrier gas is comprised primarily of hydrogen gas; and/or the carrier gas is comprised essentially entirely of hydrogen gas.

By utilizing HSA when nitriding in the foregoing manner, the present invention often can avoid the need to dispose of non-dissociated ammonia gas, which is a common problem in conventional techniques. As a further benefit, use of a catalyst often can be omitted in the foregoing arrangements.

In more particularized aspects of the invention, the carrier gas is primarily, or essentially all, hydrogen gas. As a result, buildup of oxides on the surface of the metal often can be significantly inhibited.

Comments on the Summary

The foregoing summary is intended merely to provide a quick understanding of the general nature of the present invention. A more complete understanding of the invention can only be obtained by reference to the following detailed description of the preferred embodiment in connection with the accompanying drawings.

DESCRIPTION OF THE PREFERRED EMBODIMENTS

Actuator Assembly

Figure 1:
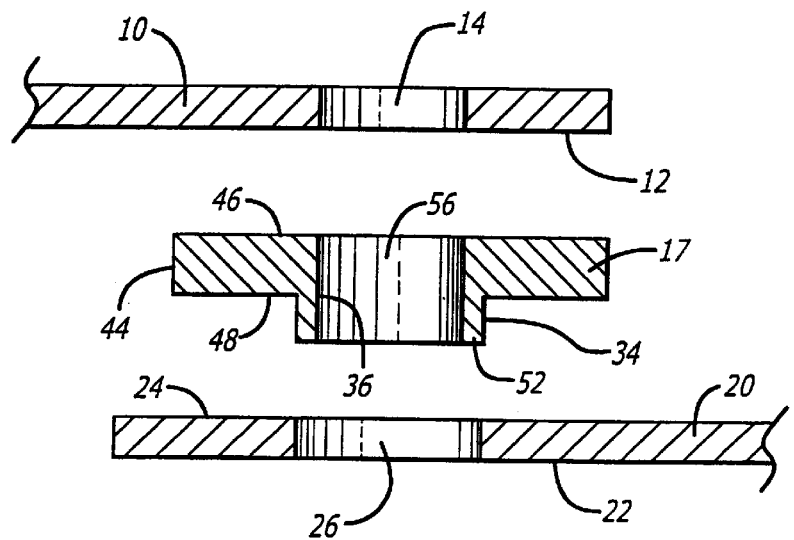
FIG. 1 is an exploded partial horizontal sectional view of an actuator arm, load beam and swage mount of the present invention.
Figure 2:
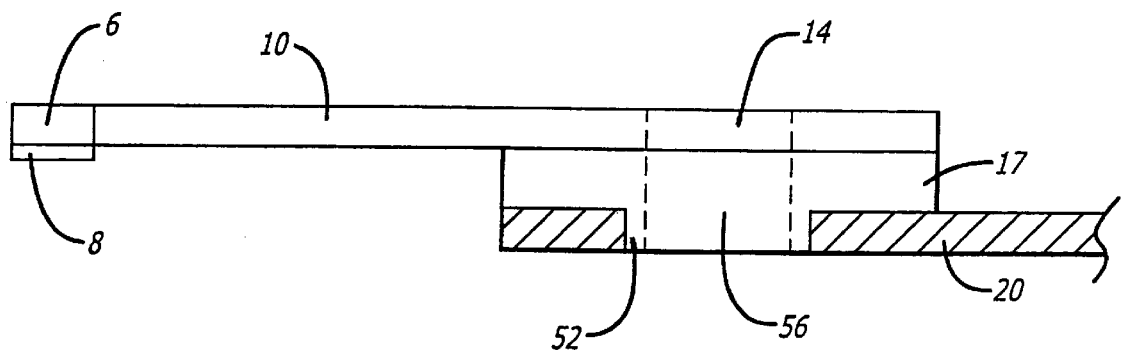
FIG. 2 is an enlarged partial horizontal sectional view of a load beam mounted to an actuator arm using the swage mount of the present invention.

FIGS. 1 and 2 show a swage mount assembly constructed in accordance with a representative embodiment of the present invention. In a conventional disk drive, a load beam 10 includes a proximal end, generally rectangular in shape, that extends and tapers to a distal end. Suspended on the distal end of load beam 10 is a read/write head 8 connected to the load beam via a feature 6. The proximal end of load beam 10 includes a planar attachment face 12 and a centrally formed swage opening 14 for allowing the passage of a swaging element during assembly of the disk drive, in a manner known in the art.

An actuator arm 20 is formed from a metal base 22, and includes a planar mounting surface 24 at its distal end. A swage opening 26 is formed centrally through mounting surface 24 for telescopically receiving hub 52 of swage mount 17. Actuator arm 20 is typically mounted at its proximal end (not shown) to an actuator controller that sweeps actuator arm 20 through a predetermined angular path along a horizontal plane, in a manner that is known to those skilled in the art.

Swage mount 17 includes a horizontal base plate 44 having oppositely disposed first and second planar surfaces 46 and 48 for contacting planar attachment surface 12 of load beam 10 and mounting surface 24 of actuator arm 20, respectively. Base plate 44 may be formed in a variety of peripheral polygonal shapes, for example a rectangular shape, depending on the configuration of load beam 10 and actuator arm 20. Extending from second planar surface 48 of swage mount 17 is a cylindrical hub 52 having an aperture 56 formed therethrough. Although hub 52 is cylindrical in the preferred embodiment of the invention, it should be noted that various other shapes may instead be used, provided that the hub includes an aperture for swaging. The cylindrical wall of aperture 56 within hub 52 defines an inner swaging surface 36, which is contacted by a swaging element during drive assembly, and an outer engagement surface 34, which contacts the inner cylindrical wall of swage opening 26 in actuator arm 20.

Swage mount 17 fastens load beam 10 to actuator arm 20 in the following manner. First, planar surface 46 of base plate 44 is typically welded to planar attachment surface 12 of load beam 10 such that hub 52 projects outwardly from load beam 10 and such that aperture 56 aligns with swage opening 14 of load beam 10. Swage opening 26 of actuator arm 20 is then brought into longitudinal alignment with load beam 10 with swage opening 26 of actuator arm 20 closely fitted around hub 52 such that actuator arm 20, load beam 10 and swage mount 17 form a vertically stacked joint. Once proper alignment is obtained, a swaging element is inserted through swage opening 14 of load beam 10 and into aperture 56 of swage mount 17. Typically, the swaging element is spherical and, when inserted into aperture 56, exerts force on inner swaging surface 36 of hub 52. This force causes a radially outward displacement of hub 52 resulting in the plastic deformation of hub 52. This displacement causes outer engagement surface 34 of hub 52 to exert a radially outwardly compressive frictional force against the inner wall of swage opening 26 of actuator arm 20. As a result of this process, an interference fit is formed which bonds actuator arm 20 to swage mount 17 and also provides torque resistance for inhibiting the angular rotation of load beam 10 relative to actuator arm 20.

Alternatively, swage mount 17 can be first welded to actuator arm 20 with hub 52 then engaging the swage opening 14 of load beam 10. As a further alternative, the swage mount 17 can be swaged through both the load beam 10 and the actuator arm 20, resulting in the load beam 10 being sandwiched between the swage mount 17 and the actuator arm 20. As a still further alternative, swage mount 17 (or simply hub 52) can be integrally formed with either load beam 10 or actuator arm 20. In any event, load beam 10 and actuator arm 20 preferably are swage mounted together.

It has been found that significantly increased torque retention characteristics can be achieved when at least one surface of the swage mount interference fit: (1) is relatively hard, (2) includes numerous small protrusions, or (3) has both such features, with the best torque retention characteristics appearing to occur with scenario (3). As described above, increasing the torque retention properties of low profile swage mounts used in disk drive actuator assemblies allows increased drive access speeds while maintaining a low drive profile. Also, in addition to increasing torque retention in this manner, the internal geometry of swage mount 17 can then be designed to substantially improve gram change, as well as reducing the mass of the swage mount, because the hub can be shortened without sacrificing retention torque, thereby resulting in reduced inertia of the part and thus the assembly.

Swage Mounting Using Increased Surface Hardness

As noted above, increasing the hardness of at least one surface of the swage mount interference fit can often increase torque retention characteristics. At the same time, simply increasing the hardness of an entire component frequently results in poor performance as work hardening through swaging becomes limited. Accordingly, it is preferred that at least one of the interference fit surfaces of the swage mounting is harder than the rest of the component in which it is included. This situation is illustrated for two different embodiments of the invention in FIGS. 3 and 4, respectively.

Figure 3:
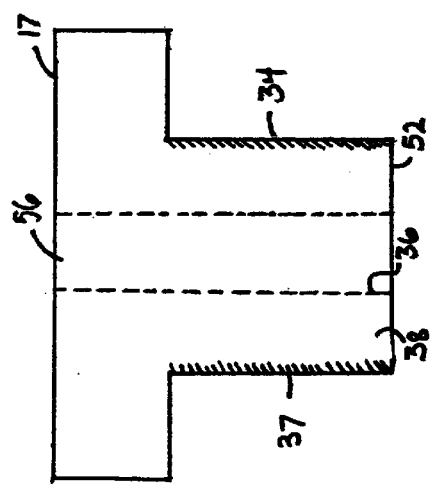
FIG. 3 is a representational horizontal sectional view of a swage mount, illustrating surface hardness, according to one embodiment of the invention.

FIG. 3 illustrates swage mount 17 according to one embodiment of the invention. As indicated in FIG. 3, the outer surface 34 of hub 52 on swage mount 17 is harder than the core of swage mount 17. Preferably, this hardness differential is at least 20 hardness Vickers and, more preferably, is at least 30 hardness Vickers. Region 37 indicates a hardness region within hub 52. The nature of region 37 will vary depending upon the process used to form it. In some cases, region 37 will be uniformly hard and in others hardness gradients may be present within region 37.

By causing outer surface 34 of hub 52 to be harder than core 38, torque retention can be increased upon swaging. It should be noted that swage mount 17 is shown in FIG. 3 for illustrative purposes only and is not critical to this aspect of the invention. Rather, the important feature of this embodiment of the invention is that the surface of the swage mounting hub is harder than the core of the component of which it forms a part.

Figure 4:
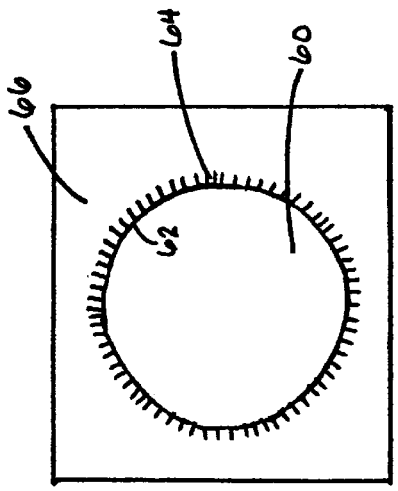
FIG. 4 is a representational top view of a swage mount opening, illustrating surface hardness, according to another embodiment of the invention.

FIG. 4 illustrates an alternative embodiment of the invention. In this embodiment, the inner surface 62 of swage opening 60 is harder than the core 66 of the component of which swage opening 60 forms a part. Once again, the hardness differential preferably is at least 20 hardness Vickers and, more preferably, is at least 30 hardness Vickers. Region 64 indicates a hardness region of swage opening 60. The nature of region 64 will vary depending upon the process used to form it. In some cases, region 64 will be uniformly hard and in others hardness gradients may be present in region 64. Swage opening 60 might, for example, be opening 14 in load beam 10 or opening 26 in actuator arm 20.

By causing outer surface 34 of hub 52 to be harder than core 38, or causing inner surface 62 of swage opening to be harder than core 66, torque retention often can be increased.

It is noted that it is also possible to utilize both a harder outer surface 34 and a harder inner surface 62, thus combining features from the two embodiments described above. Processes for providing a surface which is harder than the core are discussed below.

Swage Mounting Using Surface Protrusions

Figure 6:
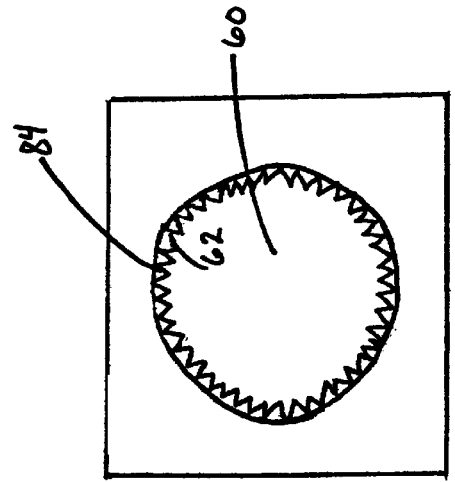
FIG. 6 is a representational top view of a swage mount opening, illustrating the inclusion of surface protrusions, according to another embodiment of the invention.
Figure 5:
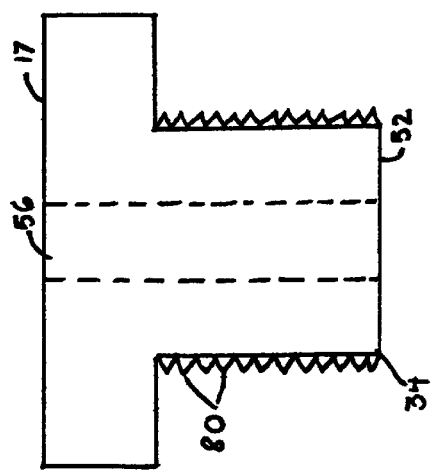
FIG. 5 is a representational horizontal sectional view of a swage mount, illustrating the inclusion of surface protrusions, according to another embodiment of the invention.

Including small surface protrusions on at least one surface of the swage mount interference fit also can often increase torque retention. Two examples are illustrated in FIGS. 5 and 6. FIG. 5 illustrates an embodiment in which swage mounting hub 52 includes numerous small surface protrusions 80 on its outer surface 34. Preferably, protrusions 80 are in the micron range in height, such as less than 50 microns in height, more preferably, between approximately 0.1 and 50 microns in height, and even more preferably, between approximately 0.5 and 10 microns in height. It is also preferable that protrusions 80 are significantly harder than the rest of the component (or the surface of the component) of which hub 52 forms a part, preferably, at least 50 hardness Vickers harder. However, it is not strictly necessary that the protrusions be harder than the rest of the component.

Also, in the preferred embodiments of the invention, protrusions 80 are made primarily of one or more materials that are different than the material or materials primarily making up the rest of the component (or the surface of the component) of which hub 52 forms a part. For example, protrusions 80 might be made primarily of carbides or nitrides, while the remainder of the component is made primarily of stainless steel. Typically, protrusions 80 cover between approximately 0.5% and 15% of the outer surface 34 of hub 52. Once again, it is noted that although hub 52 is shown as being included in swage mount 17, hub 52 can instead be provided in any of the other ways described above.

FIG. 6 illustrates an alternative embodiment in which the inner surface 62 of swage mount opening 60 includes numerous small protrusions 84, which have the preferred characteristics described above in connection with the description of FIG. 5. Specifically, protrusions 84 preferably are in the micron range in height, such as less than 50 microns in height, more preferably, between approximately 0.1 and 50 microns in height, and even more preferably, between approximately 0.5 and 10 microns in height. It is also preferable that protrusions 84 are significantly harder than the rest of the component of which swage mount opening 60 forms a part, preferably, at least 50 hardness Vickers harder. However, it is not necessary that the protrusions be harder than the rest of the component. As one alternative embodiment, it is possible that the surface protrusions be of the same hardness as the rest of a surface coating that is applied to the component (e.g., a polymer coating), which coating is harder than the rest of the component. Also, in the preferred embodiments of the invention, protrusions 84 are made primarily of one or more materials that are different than the material or materials primarily making up the rest of the component of which swage mount opening 60 forms a part. For example, protrusions 84 might be made primarily of carbides or nitrides while the remainder of the component is made primarily of stainless steel. Typically, protrusions 84 cover between approximately 0.5% and 15% of the inner surface 62 of swage mount opening 60. It is noted that swage opening 60 might, for example, be opening 14 in load beam 10 or opening 26 in actuator arm 20.

By causing outer surface 34 of hub 52 or inner surface 62 of swage mount opening 60 to include such small protrusions, torque retention often can be increased. It is also possible to utilize such protrusions both on the outer surface 34 and on the inner surface 62. Processes for providing such protrusions are discussed below.

Certain techniques are described below for simultaneously surface hardening a component (e.g., a swage mounting component, such as swage mount 17) and providing the component with surface protrusions. The carburizing and nitriding techniques described below utilize a furnace. Preferably, the furnace is a continuous belt furnace, such as a "humpback" furnace. An example of a humpback furnace is the Hayes Continuous Belt Furnace sold by C.I. Hayes of Rhode Island under the product designation BAC-MH-02-03-18/AD150.

Carburizing Techniques

Various carburizing techniques can be utilized to provide a component with both a surface that is harder than the component's core and a number of small protrusions that are harder than the rest of the component. However, the following technique has certain advantages over conventional techniques, such as permitting carburization to occur in a continuous belt furnace.

The following discussion describes carburizing a swage mount 17 for use in a disk drive actuator arm assembly. However, it should be understood that the process can be applied to other components as well.

In this example, swage mount 17 typically is constructed from an austenitic stainless steel (SS), such as 300 series SS, because of the corrosion resistant properties of that material. In one embodiment, type 305 SS is used to form the component. After formation through stamping, however, the Vickers hardness of swage mount 17 may increase up to approximately 350–425 hardness Vickers (HV) as result of the strain hardening on the metal during stamping. A Vickers hardness in this range renders the component with a high yield stress which results in poor strain hardening through the swaging operation and thus low retention torque. The high yield stress also results in higher swage forces that produce poor gram load change characteristics. To avoid this consequence, swage mount 17 generally is annealed after stamping to reduce its Vickers hardness to approximately 135 HV, a value that is more suitable for swaging.

The following describes one example of such annealing. The furnace preferably is set at approximately 1850° Fahrenheit (F), and hydrogen gas is introduced into the rear of the furnace at approximately 35 cubic feet (CF) per hour (CFH). The furnace belt speed is set at approximately 4.5 inches per minute. Approximately 5,000 parts (approximately 100 grams) are loaded into each basket, and baskets are placed on the furnace belt one behind the other. It is noted that at 4.5 inches per minute the baskets are in the heat zone of the furnace for approximately 7.33 minutes. At the end of the annealing process, a representative number of parts from each basket is hardness tested, with the target range being 135±10 HV.

The furnace temperature for the annealing step generally will be set depending upon the type of metal being annealed. Although 1850° F. is preferred for annealing stainless steel, annealing of stainless steel may occur at temperatures as low as 1600° F., with the preferred temperature range being from 1800–2000° F. Similarly, the time within the heat zone of the furnace also can be altered, with the preferred range being from 5 to 15 minutes. In a representative embodiment of the invention, a step of cooling to ambient temperature over a period of approximately 15 minutes follows.

Upon completion of such annealing and cooling, the parts are carburized. During the carburizing process according to the preferred embodiment of the present invention, a carburizing gas and a carrier gas are introduced into the furnace. The carburizing gas supplies carbon atoms, while the carrier gas serves to control the amount of carbon at the component's surface. Thus, the carburizing gas generally can be any carbon-rich gas, such as methane ($CH_4$). In conventional carburization techniques, the carrier gas is an endothermic gas that is typically heavier than air and that typically consists mainly of nitrogen ($N_2$) and carbon monoxide (CO), with smaller amounts of carbon dioxide ($CO_2$), hydrogen ($H_2$) and water ($H_2O$). However, according to the preferred embodiment of the present invention, the carrier gas is non-endothermic, is a reducing gas, and/or is lighter than air, such as a gas consisting primarily, almost entirely, or completely, of hydrogen.

The carburizing process according to the preferred embodiment of the present invention is accomplished by heating the furnace preferably to approximately 1850° F. Although the furnace may instead be heated to another temperature, it is preferable that the temperature be at least 1600° F. and, more preferably, between 1800 and 2000° F. Hydrogen gas is introduced at the rate of approximately 25 CFH into the rear of the furnace. Hydrogen gas also is introduced into the front of the furnace at a rate of approximately 7.5 CFH. Thus, total hydrogen used in the hardening step according to the preferred embodiment of the invention is approximately 32.5 CFH. Gas flow can be measured using a Sierra Mass Trak Flow Meter (Model 810c). A carbon-rich gas, such as methane, is introduced into the furnace, preferably so as to maintain a methane concentration of approximately 1% to 5%, more preferably, 2% to 4% and, even more preferably, 2.5% by mass.

For this purpose, a Siemens gas analyzer (model# 7MB233 IR-absorbing, Model Ultramat 23) can be used to sample furnace gas pulled from the heat zone of the furnace. The analyzer preferably is calibrated daily using a pre-mix bottle of $CO/CO_2/CH_4$. In the above gas mixture, it is preferable to use ultra high purity (UHP) methane with 99.9% pure hydrogen. In order to obtain the correct amount of methane, it is preferable to use a Honeywell controller (model UDC 3300). This controller receives a millivolt signal from the Ultramat 23 telling it what percentage of $CH_4$ is present in the furnace.

Once again, belt speed preferably is adjusted to approximately 4.5 inches per minute, which results in approximately 7.33 minutes in the heat zone of the furnace. The amount of time within the heat zone may be altered, but preferably is within the range of 5 to 15 minutes. Approximately 833 parts (or 16.5 grams) are placed into each basket and the baskets are placed one behind the other on the furnace belt.

The foregoing carburization process results in both surface hardness and the formation of numerous small protrusions on the surface of the component. Specifically, some of the carbon atoms react with chromium and other elements in the stainless steel to form small carbide protrusions that are in the micron range in height, typically between 0.5 and 5 microns in height. Such protrusions typically are formed mainly at grain boundaries. Because these protrusions are primarily comprised of one or more carbides, they are significantly harder than the stainless steel that makes up the rest of the component.

Utilizing the above process, a swage mount having increased surface hardness and numerous small hard surface protrusions is provided, resulting in increased torque retention characteristics. Advantageously, because the core of swage mount 17 is softened during the annealing step, swage mount 17 generally will plastically deform during swaging. Also, because torque retention is significantly increased by increasing surface hardness and providing such small protrusions, the internal geometry of swage mount 17 can then be designed to improve gram change characteristics and/or to reduce mass.

Because carburization is only required for certain surfaces of a component, other surfaces of the component may be masked to prevent the embedding of carbon atoms. Such masking techniques are well known in the art and include, for example, copper plating.

Also, although annealing and carburizing are described as separate steps above, it is also possible to combine those processes into a single step. For example, this can be accomplished by simply adding 1% to 5% concentration of methane to the hydrogen atmosphere of the annealing step described above. However, it has been found that separating the annealing and carburizing steps generally produces better results.

The conditions described above for heat treating a component, i.e., furnace temperature, hydrogen gas to methane gas ratio, and belt speed (or, alternatively, heating time), may be varied to provide different Vickers hardnesses for the surface of swage mount 17, different differential hardnesses between the surface and the core, and different sizes and numbers of surface protrusions. For example, by increasing the concentration of methane gas introduced into the furnace during carburization, both the depth and the hardness of the surface layer can be increased and the number, density, size and height of the surface protrusions can be increased. Also, raising the temperature of the furnace or reducing the furnace belt speed (i.e., increasing heat time) generally will provide the same results. Finally, other gases, such as natural gas or propane, may be substituted for the methane gas in the gas carburizing process. Tests have shown that by adjusting the heat treatment parameters, as described above, the surface hardness of swage mount 17 can be increased to over 450 HV. Generally, the parameters will be selected so as to achieve the desired surface hardness, hardness depth, and surface protrusion characteristics.

A person skilled in the art will recognize that through routine experimentation, multiple combinations of surface hardness, core hardness and surface protrusion characteristics can be achieved to suit the particular application design parameters that need to be addressed. The inventive carburization process therefore is not limited to the specific process parameters disclosed.

Nitriding Techniques

Various nitriding techniques also can be utilized to provide a component with both a surface that is harder than the component's core and a number of small protrusions that are harder than the rest of the component. However, the following technique has certain advantages over conventional techniques, such as eliminating the need to use a catalyst, avoiding the use of ammonia ($NH_3$), and significantly reducing processing time.

It is noted that in conventional nitriding techniques the nitriding gas is ammonia. Often, a portion of the ammonia gas (typically around 30%) dissociates on the metal's surface into nitrogen and hydrogen, and then some the nitrogen atoms diffuse into the metal's surface. Thus, the gases leaving the furnace in such a conventional nitriding process typically include nitrogen, hydrogen and undissociated ammonia, which ordinarily must be either trapped in water or burned.

However, according to the preferred embodiment of the present invention, the nitriding gas introduced into the furnace is instead comprised of a mixture of nitrogen and hydrogen. Preferably, the mixture includes approximately 4 to 20% nitrogen by mass. At 1500° F. it is preferable to use approximately 4 to 8% (more preferably, 6%) nitrogen by mass, and at 1950° F. it is preferable to use approximately 20% nitrogen by mass. In the former case, the core generally does not fully anneal. In the latter case, generally the surface is harder (due to the larger number of nitrides formed there)

while the core is softer than in the former case. Thus, the percentage of nitrogen may be significantly less than in conventional techniques, even after taking into consideration dissociation in such conventional techniques. In addition, by introducing such a greater amount of hydrogen, the present invention can overcome many problems with conventional techniques. Specifically, the larger quantity of hydrogen present in the inventive technique tends to have the effect of keeping the metal surface clean, i.e., preventing the buildup of a layer of iron nitrides (commonly called the white layer) which otherwise might have to be ground off upon completion of the nitriding process. As a further result, nitrogen atoms can continue to more efficiently diffuse into the metal's surface, typically without the need for a catalyst. As a still further result, nitriding according to the present invention often can be completed in significantly less time than conventional processes would permit.

Stress relief is the initial processing step in the technique according to the preferred embodiment of the invention. This step preferably is performed as follows. First, the furnace temperature is set at approximately 700° F. Next, hydrogen gas is introduced into the rear of the furnace at approximately 35 CFH. The furnace belt speed is set at approximately 4.5 inches per minute. Approximately 5,000 parts (approximately 100 grams) are loaded into baskets of about 3.5 inches wide by 5.5 inches long, and the baskets are placed on the belt one behind the other. It is noted that at 4.5 inches per minute the baskets are in the heat zone for approximately 7.33 minutes.

Although the foregoing parameters are preferred, various other combinations may be used to perform stress relief. For instance, any temperature up to the transformation temperature of the metal (approximately 1600° F. for stainless steel) may be used to relieve stress. Similarly, the time within the heat zone can be varied, with the preferred range being between 5 and 15 minutes. In a representative embodiment of the invention, a step of cooling to ambient temperature over a period of approximately 15 minutes follows.

Upon completion of the stress relief and cooling steps, the furnace temperature is set at approximately 1500° F. Next, hydrogen gas is introduced into the rear of the furnace at approximately 25 CFH and into the front of the furnace at approximately 7.5 CFH. Thus, the total hydrogen used in the hardening cycle is 32.5 CFH. Nitrogen gas ($N_2$) is introduced into the rear of the furnace at approximately 1.95 CFH, resulting in approximately 6% by mass $N_2$ in the furnace. It is preferable to use 6% $N_2$ (of 99.9% purity) with 99.9% pure $H_2$. In order to obtain the correct balance of nitrogen and hydrogen, it is preferable to use a Sierra Mass Trak Flow Meter (Model 810c).

The furnace belt speed is set at approximately 4.5 inches per minute (approximately 7.33 minutes in the heat zone). Approximately 833 parts (approximately 16.5 grams) are loaded into baskets of approximately 3.5 inches wide by 5.5 inches long, and the baskets are placed on the belt one behind the other. When using the foregoing parameters, Vickers hardness testing (using a 500 gram load) has shown an average surface hardness of 206.7 HV.

While the above parameters are preferred, other parameters may instead be used. For instance, the time within the heat zone can be varied, with 5 to 15 minutes being the preferred range. Similarly, other furnace temperatures can be used, with 900° F. up to the transformation temperature of the metal (approximately 1600° F. for stainless steel) being the preferred range. Finally, the concentration of nitrogen also can be varied, with 4% to 8% being the preferred range in one embodiment and approximately 20% being the preferred concentration in another.

The foregoing nitriding process results in increased surface hardness, as well as the formation of numerous small protrusions on the surface of the component. Specifically, some of the nitrogen atoms react with iron and other atoms in the stainless steel to form small nitride protrusions that are in the micron range in height, typically between 0.5 and 5 microns in height. Such protrusions typically are formed mainly at grain boundaries. Because these protrusions are primarily comprised of nitrides, they are significantly harder than the stainless steel that makes up the rest of the component.

Utilizing the above process, a swage mount having increased surfaced hardness and numerous small hard surface protrusions is provided, resulting in increased torque retention characteristics. Because annealing also can occur during the nitriding step, the core of swage mount 17 can remain relatively soft. As a result, swage mount 17 generally will plastically deform during swaging. Also, because torque retention is significantly increased by increasing surface hardness and creating such surface protrusions, the internal geometry of swage mount 17 can then be designed to improve gram change characteristics and/or to reduce mass.

Because nitriding is only required for certain surfaces of a component, other surfaces of the component may be masked to prevent the embedding of nitrogen atoms. Such masking techniques are well known in the art and include, for example, plating with tin, nickel, bronze or copper.

The conditions described above for heat treating a component, i.e., furnace temperature, hydrogen gas to nitrogen gas ratio, and belt speed (or, alternatively, heating time), may be varied to provide different Vickers hardnesses for the surface of swage mount 17, different differential hardnesses between the surface and the core, and different sizes and numbers of surface protrusions. For example, by increasing the concentration of nitrogen gas introduced into the furnace during nitriding, both the depth and the hardness of the surface layer can be increased and the number, density, size and height of the surface protrusions can be increased. Also, raising the temperature of the furnace or reducing the furnace belt speed (i.e., increasing heat time) can often provide the same results. Generally, the parameters will be selected so as to achieve the desired surface hardness, hardness depth, and surface protrusion characteristics.

A person skilled in the art will recognize that through routine experimentation, multiple combinations of surface hardness, core hardness and surface protrusion characteristics can be achieved to suit the particular application design parameters that need to be addressed. The inventive nitriding process therefore is not limited to the specific process parameters disclosed.

Other Processes

Although the carburization and nitriding methods described above for increasing surface hardness and providing surface protrusions for components (such as swage mounting components) is preferred, other methods that achieve increased torque retention value can instead be utilized. For example, increasing surface hardness and providing surface protrusions can be achieved by using carbonitriding methods. One such method would be to use 0 to 5% of a methane-rich gas (more preferably, 0.1% to 4%), together with 0 to 8% of nitrogen (more preferably, 0.1% to 6%) in one embodiment and approximately 20% in another, and a hydrogen carrier gas.

Also, such components can be subjected to a bead blasting process, known in the art, wherein glass beads are projected at a component at a particular speed. The beating of the surface of the component increases the surface hardness of the component as well as resulting in surface protrusions. For example, a part to be surface hardened may be bead blasted in a manner known in the art using, by way of non-limiting example, 0.002" diameter glass beads at an air pressure of 80 psi in a drum rotating at approximately 5–10 RPM for one to four minutes, with four minutes being preferred.

A similar method for increasing the surface hardness of, and creating surface protrusions in, a component is called tumbling of shot peening. In tumbling, the component is placed in a bucket loaded with small steel shots and the bucket is agitated and/or rotated. Like in the bead blasting process, the mechanical beating of the surface of the component increases the component's surface hardness and results in surface protrusions.

For example, in a preferred tumbling process (shot peening), IPT part number 15118-03, annealed to a hardness of approximately 135 HV, is tumbled, in a lot size of 200,000 parts, in a Time Saver 120 type tumbler, available from Mass Finishing Inc. of Delano, Minn. The barrel of the tumbler is filled approximately half full with #S110 steel shot. No water or soap or other additive is included. The tumbler is set to rotate at about 90 RPM for approximately 90 minutes.

Various other mechanical hardening processes are known in the art and may also be used to achieve these results. For all such mechanical hardening processes, the part preferably is annealed prior to hardening, to a hardness of approximately 135 HV, or to another application-specific core hardness value.

Of course, the skilled practitioner will recognize that other methods that result in surface hardening and/or protrusion formation may be employed without departing from the spirit and teaching of the present invention. In addition various other methods can be employed which only result in surface hardening without necessarily creating surface protrusions. Such methods include, for example, plating with a harder material, laser surface hardening, flame hardening and induction heating. Also, coating with certain substances, such as certain polymers, that are harder than the underlying component can provide surface protrusions as well.

Conclusion

Although the present invention has been described in detail with regard to the exemplary embodiments and drawings thereof, it should be apparent to those skilled in the art that various adaptations and modifications of the present invention may be accomplished without departing from the spirit and the scope of the invention. Accordingly, the invention is not limited to the precise embodiments shown in the drawings and described in detail hereinabove. Rather, it is intended that all such variations not departing from the spirit of the invention be considered as within the scope thereof as limited solely by the claims appended hereto.

Also, several different embodiments of the present invention are described above, with each such embodiment described as including certain features. However, it is intended that the features described in connection with the discussion of a single embodiment are not limited to that embodiment but may be included and/or arranged in various combinations in any of the other embodiments as well, as will be understood those skilled in the art.

What is claimed is:

1. A component for use in swage mounting, comprising:
   a base plate having a first side and a second side; and
   a hub, primarily comprised of a first material, extending from the second side of said base plate and having an inner surface and an outer surface,
   wherein the outer surface of said hub includes numerous protrusions that are less than approximately 50 microns in height and that are primarily comprised of a second material which is different from the first material.

2. A component according to claim 1, wherein the first material is stainless steel.

3. A component according to claim 2, wherein the first material is a 300 series stainless steel.

4. A component according to claim 1, wherein the second material consists of one or more carbides.

5. A component according to claim 1, wherein the second material consists of one or more nitrides.

6. A component according to claim 1, wherein the second material consists of one or more nitrides and one or more carbides.

7. A component according to claim 1, wherein said numerous protrusions occupy approximately 0.5% to 15% of the outer surface of said hub.

8. A component according to claim 1, wherein said numerous protrusions are located primarily at grain boundaries.

9. A component according to claim 1, wherein said hub is cylindrically shaped and has a central axis that is perpendicular to the second side of said base plate.

10. A component according to claim 1, wherein said component is a swage mount for connecting a disk drive actuator arm to a disk drive load beam.

11. A component according to claim 1, wherein the first side of the base plate includes an opening, and wherein the inner surface of said hub substantially coincides with the opening in the first side of said base plate.

12. A component for use in swage mounting, comprising:
    a base plate having a first side and a second side; and
    a hub, primarily comprised of a base material, extending from the second side of said base plate and having an inner surface and an outer surface,
    wherein the outer surface of said hub includes numerous protrusions that are less than approximately 50 microns in height and that are substantially harder than the base material.

13. A component according to claim 12, wherein the base material is stainless steel.

14. A component according to claim 12, wherein the protrusions are comprised primarily of a second material that consists of one or more carbides.

15. A component according to claim 12, wherein the protrusions are comprised primarily of a second material that consists of one or more nitrides.

16. A component according to claim 12, wherein the protrusions are comprised primarily of a second material that consists of one or more nitrides and one or more carbides.

17. A component according to claim 12, wherein said numerous protrusions are at least 50 hardness Vickers harder than the base material.

18. A component according to claim 12, wherein said hub is cylindrically shaped and has a central axis that is perpendicular to the second side of said base plate.

19. A component according to claim 12, wherein said component is a swage mount for connecting a disk drive actuator arm to a disk drive load beam.

20. A component according to claim 12, wherein the first side of the base plate includes an opening, and wherein the inner surface of said hub substantially coincides with the opening in the first side of said base plate.

21. A component for use in swage mounting, comprising:
    a base plate having a first side and a second side; and
    a hub extending from the second side of said base plate, said hub having an inner surface and an outer surface,
    wherein the outer surface of said hub includes numerous protrusions that are from 0.5 to 50 microns in height.

22. A component according to claim 21, wherein said base plate and said hub are primarily comprised of stainless steel.

23. A component according to claim 21, wherein said numerous protrusions occupy approximately 0.5 to 15% of the outer surface of said hub.

24. A component according to claim 21, wherein said numerous protrusions are located primarily at grain boundaries.

25. A component according to claim 21, wherein said numerous protrusions are primarily comprised of at least one of a nitride and a carbide.

26. A component according to claim 21, wherein said numerous protrusions are from 0.5 to 5 microns in height.

27. A component according to claim 21, wherein said numerous protrusions are from 0.5 to 10 microns in height.

28. A component according to claim 21, wherein said hub is cylindrically shaped and has a central axis that is perpendicular to the second side of said base plate.

29. A component according to claim 21, wherein said component is a swage mount for connecting a disk drive actuator arm to a disk drive load beam.

30. A component according to claim 21, wherein the first side of the base plate includes an opening, and wherein the inner surface of said hub substantially coincides with the opening in the first side of said base plate.

31. A swage mounting assembly comprising:
a first component that includes:
a base plate having a first side and a second side, and
a hub extending from the second side of said base plate and having an inner surface and an outer surface; and
a second component that includes an opening having an inner surface that is slightly larger than the outer surface of the hub, wherein the hub is received within the opening in said second component,
wherein at least one of the following conditions is satisfied:
the hub is comprised primarily of a first material and the outer surface of the hub includes numerous protrusions that are less than approximately 50 microns in height and that are comprised of a second material which is different from the first material, and
said second component is comprised primarily of the first material and the inner surface of the opening in said second component includes numerous protrusions that are less than approximately 50 microns in height and that are comprised of the second material.

32. A swage mounted assembly according to claim 31, further comprising a swaging element disposed within the hub, exerting an outward radial force on the inner surface of said hub, causing an outward radial deformation of said hub, and causing the outer surface of said hub to exert an outward radial force against the inner surface of the opening in said second component.

33. A swage mounted assembly according to claim 31, wherein the first material is stainless steel.

34. A swage mounted assembly according to claim 31, wherein the protrusions are comprised primarily of a second material that consists of one or more carbides.

35. A swage mounted assembly according to claim 31, wherein the protrusions are comprised primarily of a second material that consists of one or more nitrides.

36. A swage mounted assembly according to claim 31, wherein the protrusions are comprised primarily of a second material that consists of one or more nitrides and one or more carbides.

37. A swage mounted assembly comprising:
a first component that includes:
a base plate having a first side and a second side, and
a hub extending from the second side of said base plate and having an inner surface and an outer surface; and
a second component that includes an opening having an inner surface that is slightly larger than the outer surface of the hub, wherein the hub is received within the opening in said second component,
wherein at least one of the following conditions is satisfied:
the hub is comprised primarily of a base material and the outer surface of the hub includes numerous protrusions that are less than approximately 50 microns in height and that are substantially harder than the base material, and
said second component is comprised primarily of the base material and the inner surface of the opening in said second component includes numerous protrusions that are less than approximately 50 microns in height and that are substantially harder than the base material.

38. A swage mounted assembly according to claim 37, further comprising a swaging element disposed within the hub, exerting an outward radial force on the inner surface of said hub, causing an outward radial deformation of said hub, and causing the outer surface of said hub to exert an outward radial force against the inner surface of the opening in said second component.

39. A swage mounted assembly according to claim 37, wherein the protrusions are comprised primarily of a second material that consists of one or more carbides.

40. A swage mounted assembly according to claim 37, wherein the protrusions are comprised primarily of a second material that consists of one or more nitrides.

41. A swage mounted assembly according to claim 37, wherein the protrusions are comprised primarily of a second material that consists of one or more nitrides and one or more carbides.

42. A swage mounted assembly according to claim 37, wherein said numerous protrusions are at least 50 hardness Vickers harder than the base material.

43. A swage mounted assembly comprising:
a first component that includes:
a base plate having a first side and a second side, and
a hub extending from the second side of said base plate and having an inner surface and an outer surface; and
a second component that includes an opening having an inner surface that is slightly larger than the outer surface of the hub, wherein the hub is received within the opening in said second component,
wherein at least one of the outer surface of the hub and the inner surface of the opening in said second component includes numerous protrusions that are from 0.5 to 50 microns in height.

44. A swage mounted assembly according to claim 43, further comprising a swaging element disposed within the hub, exerting an outward radial force on the inner surface of said hub, causing an outward radial deformation of said hub, and causing the outer surface of said hub to exert an outward radial force against the inner surface of the opening in said second component.

45. A swage mounted assembly according to claim 43, wherein said numerous protrusions are located primarily at grain boundaries.

46. A swage mounted assembly according to claim 43, wherein the protrusions are comprised primarily of a second material that consists of one or more carbides.

47. A swage mounted assembly according to claim 43, wherein the protrusions are comprised primarily of a second material that consists of one or more nitrides.

48. A swage mounted assembly according to claim 43, wherein the protrusions are comprised primarily of a second material that consists of one or more nitrides and one or more carbides.

49. A swage mounted assembly according to claim 43, wherein said numerous protrusions are from 0.5 to 10 microns in height.

* * * * *

UNITED STATES PATENT AND TRADEMARK OFFICE
CERTIFICATE OF CORRECTION

PATENT NO. : 6,754,044 B1
DATED : June 22, 2004
INVENTOR(S) : Stephen T. Braunheim et al.

It is certified that error appears in the above-identified patent and that said Letters Patent is hereby corrected as shown below:

Column 6,
Line 1, change "carburizing and" to -- carburizing temperature and --

Column 16,
Lines 13-14, change "occur-during" to -- occur during --

Signed and Sealed this

Twenty-first Day of September, 2004

JON W. DUDAS
*Director of the United States Patent and Trademark Office*